United States Patent Office 3,156,566
Patented Nov. 10, 1964

3,156,566
PROCESSES FOR IMPROVING THE TENDERNESS OF MEAT USING A COLD WATER BUFFERED ENZYME
Beverly E. Williams, La Grange Park, Ill., assignor, by mesne assignments, to Chas. Pfizer & Co., Inc., New York, N.Y., a corporation of Delaware
No Drawing. Filed July 22, 1963, Ser. No. 296,437
1 Claim. (Cl. 99—107)

This invention relates to processes for improving the tenderness of meat by the multiple entry injection of a cold water buffered proteolytic enzyme solution into the meat while the meat is still warm and flaccid after slaughter and before the completion of rigor mortis.

In previous patents issued to me I have disclosed processes for improving the tenderness of meat by multiple entry injection of enzyme solutions into the meat at or above animal body temperatures while the edible animal carcass is still warm and flaccid and before the completion of rigor mortis. With these processes it is sometimes possible to obtain an excessive enzyme activity before the meat is cooled in the conventional cooler to below approximately 55° F. which arrests enzymatic activity. To prevent this and to prevent overtenderization of the meat, various chemical buffers have been tried to arrest the effect of the enzyme. Unfortunately, once the action of the enzyme is arrested the activity of the enzyme cannot be reestablished with the result that either very uneven tenderization occurs or the enzyme is buffered to the point where no tenderizing action takes place.

Most unexpectedly, I have found that if the proteolytic aqueous enzyme solution is held at approximately 32° F. the action of the enzyme after multiple entry injection into the warm and flaccid carcass is buffered so that very little enzymatic action takes place before the meat is chilled in the cooler and that almost 90% of the tenderizing action of the enzyme takes place during the subsequent cooking of the meat. I have found that this produces a much more uniform tenderization of the meat. It is also advantageous to hold the enzyme solution at approximately 32° F. since at this temperature the enzyme is dormant and the solution remains uniform without self-destruction of the enzyme therein prior to the injection.

Buffering the action of the enzyme by cold water solution in accordance with the present invention prevents overtenderization; prevents spotty tenderization; prevents mushiness of the meat; and provides a uniformity of strength of the enzyme solution before injection into the meat meeting the requirements of the Meat Inspection Division of the U.S. Department of Agriculture.

More potent proteolytic enzyme is required in the cold water buffered solutions of the present concept than in the warm solutions heretofore proposed since less time is available for the proteolytic enzyme to tender the meat.

It is therefore the object of the present invention to provide novel processes for the tenderizing of meat by multiple entry injection of the edible animal carcass with a proteolytic enzyme solution while the meat is still warm and flaccid and before the completion of rigor mortis in which the action of the enzyme is buffered by utilizing the same in an aqueous solution held at about 32° F. before injection into the meat.

The aqueous solution of the proteolytic enzyme may be held and used at temperatures slightly below 32° F. without freezing of the solution if a blood-level or isotonic amount of salt is used in the solution and may also be held and used at temperature somewhat above 32° F. so long as the solution after injection is not raised by animal body heat to much above 55° F.

All of the protolytic enzymes may be used in the present procedures and various of these enzymes have been tested as will appear more fully hereinafter. The proteolytic enzyme papain is readily available commercially and in varying degrees of refinement and potency and is therefore the proteolytic enzyme which I now prefer to use in these processes. When this enzyme is maintained in an aqueous solution at about 32° F. it is almost completely dormant. When a freshly slaughtered warm beef carcass is injected while still flaccid and before rigor mortis is completed with such a cold aqueous solution, the temperature of the injected solution is raised about 20° F. but is not above about 55° F. It has long been known that little tenderization of beef takes place when the beef is chilled to 55° F. or below and at temperatures in the range between 55° and 32° F. the proteolytic enzyme is virtually dormant and inactive. Below freezing no tenderization of the beef takes place and the enzyme is completely dormant.

It is therefore apparent that even after injection into the warm animal carcass the activity of the enzyme in the aqueous solution is buffered by the temperature of the solution in the meat in the range of from 55° F. to 32° F. Very little tenderizing of the beef can then take place during the normal period after injection and while the carcass is being chilled in the cooler in conventional manner to the usual temperature range of approximately 35° to 42° F.

Injection of the carcass with a cold aqueous solution has the additional advantage of rather rapidly chilling at least the thinner portions of the carcass so that the initial "hot" or first chill rooms can be maintained at 34° F., which is the temperature of the holding coolers, instead of from 26° F. to 28° F. as is conventional.

In the examples of the processes of the present invention which follow for purposes of illustration, the potency of the proteolytic enzyme will be described as "HU/g." which is the accepted designation of potency of the enzyme. "H" stands for hemoglobin; "U" stands for unit; and "g." stands for grams. Thus, a proteolytic enzyme described as having a strength of 100 HU/g. is 2½ times as effective in digesting hemoglobin as a proteolytic enzyme having a strength of 40 HU/g.

Isotonic amounts of salts may be used in the cold aqueous proteolytic enzyme solution in amounts up to 1.8%; various sugars may also be used in the solution; and other chemicals may also be employed to prevent freezing of the aqueous proteolytic enzyme solution at temperatures slightly under 32° F.

The period of activity of the proteolytic enzyme, buffered in accordance with the present invention, is relatively short, taking place primarily during the cooking of the meat so that a higher potency, more highly refined enzyme must be used. In tests conducted with the proteolytic enzyme papain, three different potency levels were used, namely, 20 HU/g., 40 HU/g. and 100 HU/g. The 20 HU/g. potency papain is suitable for use in my previously described processes for tenderizing meat using warm aqueous solutions but was found to be too weak for use in the cold water buffered proteolytic enzyme solutions of the present invention. As a generality, twice as much potency of the enzyme is required for cold water buffered enzyme solutions than for enzyme solutions in warm water. A 40 HU/g. enzyme potency should therefore be most efficient in the processes of the present invention and such has proved to be the case.

Cold water buffered enzyme solutions containing a 100 HU/g. potency proteolytic enzyme proved to be too strong and overtenderization of the meat occurred during cooking, especially when the cooking was prolonged, as with roasting, and as with steam-table holding.

When bromelin or ficin is used as the proteolytic enzyme in place of papain, approximately one quarter as much is used since refined bromelin and ficin are rated at approximately four to seven times the potency of refined papain. Combinations of the enzymes papain, bromelin and ficin may be used preferably with a potency approximating 40 HU/g.

As examples of the processes of the present concept; to illustrate the present invention; and as Example I, a 600 pound beef steer carcass was divided into two three-hundred pound sides and the left side was stitch pumped with an aqueous solution of papain, said solution weighing approximately 3% of the carcass weight or 2½% of the boneless meat weight of the side. This aqueous solution contained approximately 1½ ounces of salt and approximately one gram of papain having a potency of 20 HU/g. with the aqueous solution maintained at approximately 32° F. The aqueous enzyme solution was injected into the left side of the carcass at pressures approximating 35-100 pounds per square inch and averaging about 45 pounds per square inch. The injected side and the control side were then hung in a cooler for 24 hours at from 28° to 34° F. Steaks were then cut from the rib end of the loin both of the treated side and of the control side. These steaks were cooked and organoleptic tests showed very little difference in tenderness between them. At the end of five days of hanging in the cooler other steaks were removed from both the control side and the treated side and were cooked. Organoleptic tests showed that steaks from the treated side exhibited more tenderness than the steaks from the control side. The same results obtained for steaks removed from the control side and the treated side after seven days of hanging in the cooler but the increase in tenderness of the meat of the treated side was not considered as exhibiting a commercially significant improvement in tenderness.

The same process was then carried out as in Example I above utilizing a cold aqueous papain solution in which the papain was rated at 100 HU/g. and the control side and the treated side were then hung in the cooler as before. At the end of 24 hours of hanging in the cooler, steaks were removed as before and cooked. The cooked steaks from the treated side had soft spots. At the end of five days and after seven days of hanging in the cooler, the steaks removed and cooked from the treated side exhibited mushiness and overtenderization.

The same process as described above in Example I was then conducted using a cold aqueous injection solution of papain at approximately 32° F. and of a potency of 40 HU/g. After 24 hours of hanging in the cooler, steaks were removed from the treated side and from the control side and were cooked. The steaks from the treated side exhibited discernibly more tenderness than the steaks from the control side. After five days and seven days of hanging in the cooler, steaks from the control and treated sides were cooked. Steaks from the treated side exhibited no soft spots and were voted by the taste panel as at least 20% more tender than the cooked steaks from the control side.

The process of Example I was then followed using bromelin as the proteolytic enzyme and using ¼ the amount thereof as compared to papain. No discernible improvement in tenderness of the treated meat as compared to the control was found by organoleptic testing after hanging the meat in the cooler for from 1 to 7 days.

When bromelin was used in the cold aqueous enzyme solution in amounts approximating ¼ the amount of papain, the taste panel found at least 20% improved tenderness in the treated meat as compared to the control.

It should now be apparent that the cold water buffering of the proteolytic enzymes of the present invention arrests or delays the action of the enzyme between the time of injecting the carcass and the cooling of the carcass to temperatures at which the enzyme is relatively inactive while "unbuffering" or releasing the enzyme when activity is desired when the meat is raised in temperature prior to and in preparation for cooking and during the cooking of the meat.

It should further be apparent that the present invention in every way satisfies the objective discussed above.

Changes in or modification to the above described illustrative embodiments of the processes of this invention may now be suggested to those skilled in the art without departing from the present inventive concept. Reference should therefore be had to the appended claim to determine the scope of this invention.

What is claimed is:

In a process for increasing the tenderness of cooked meat, the steps of adding an aqueous proteolytic enzyme solution by multiple entry injection of approximately 3% solution by weight under pressures of from 35 to 100 pounds per square inch and at a temperature of about 32° F. such that the temperature of the solution in the meat does not exceed approximately 55° F. directly into the meat of freshly slaughtered edible animals before completion of rigor mortis whereby the activity of the proteolytic enzyme on the meat is buffered and minimized during the subsequent chilling process and the greater part of the activity of the proteolytic enzyme occurs during the cooking of the meat with increase in tenderness of the meat, the proteolytic enzyme being selected from the group consisting of papain, bromelin, ficin and combinations thereof having a potency of approximately 40 HU/g. in an amount of approximately 1 gram for each 300 pounds of meat treated.

References Cited in the file of this patent

UNITED STATES PATENTS

| | | |
|---|---|---|
| 2,471,282 | Paddock | May 24, 1949 |
| 2,805,163 | Williams et al. | Sept. 3, 1957 |
| 3,073,701 | Niblack | Jan. 15, 1963 |